US012477387B2

(12) United States Patent
Tammana et al.

(10) Patent No.: US 12,477,387 B2
(45) Date of Patent: Nov. 18, 2025

(54) SYSTEMS AND METHODS FOR DYNAMIC CARRIER AGGREGATION CELL RELATIONSHIP MANAGEMENT

(71) Applicant: T-Mobile Innovations LLC, Overland Park, KS (US)

(72) Inventors: Deepak Nadh Tammana, Bothell, WA (US); Roopesh Kumar Polaganga, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 860 days.

(21) Appl. No.: 17/661,665

(22) Filed: May 2, 2022

(65) Prior Publication Data

US 2023/0354090 A1 Nov. 2, 2023

(51) Int. Cl.
*H04W 4/00* (2018.01)
*H04W 28/02* (2009.01)
*H04W 28/06* (2009.01)
*H04W 28/08* (2023.01)
*H04W 28/20* (2009.01)

(52) U.S. Cl.
CPC ....... *H04W 28/0273* (2013.01); *H04W 28/06* (2013.01); *H04W 28/0942* (2020.05); *H04W 28/20* (2013.01)

(58) Field of Classification Search
None
See application file for complete search history.

(56) References Cited

U.S. PATENT DOCUMENTS

| 2012/0207089 | A1* | 8/2012 | Kone | H04W 52/0206 |
| | | | | 370/328 |
| 2018/0124784 | A1* | 5/2018 | Kumar | H04W 52/0206 |

\* cited by examiner

*Primary Examiner* — Zewdu A Beyen
(74) *Attorney, Agent, or Firm* — Shook, Hardy & Bacon L.L.P.

(57) ABSTRACT

Dynamic carrier aggregation cell relationship management systems and methods are provided. In some embodiments, carrier aggregation relationship configuration logic computes carrier aggregation utilization statistics for primary serving cell and secondary serving cell relationship configurations. The logic further reconfigures primary serving cell to secondary serving cell relationships based on the utilization statistics to provide carrier aggregation coverage to user equipment that most efficiently utilizes the extra bandwidth made available by activating a secondary serving cell for carrier aggregation. The ability to dynamically reconfigure primary service cell to secondary service cell relationships improves carrier aggregation utilization, reduces congestion, and improves network resource utilization.

18 Claims, 8 Drawing Sheets

SYSTEMS AND METHODS FOR DYNAMIC
CARRIER AGGREGATION CELL
RELATIONSHIP MANAGEMENT

BACKGROUND

Wireless telecommunications networks, such as 5G and LTE networks are standardized to facilitate aggregation of multiple carrier combinations in order to provide higher data speeds and throughput to the user equipment (UE) of end users. Ideally, serving carriers used for carrier aggregation at a cellular site cover overlapping geographical areas so that carrier aggregation capable UE in such locations can activate use of multiple serving carriers and take advantage of the resulting enhanced data throughput. However, in real-world cellular site installations, for various reasons, the geographic area of cells formed for the different serving carriers frequencies often only partially overlap, leaving substantial geographic regions within which carrier aggregation for UE cannot be activated. In such cases, those UE are unable to realize the benefits of carrier aggregation and the efficient utilization of network resource capacity is negatively impacted.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

In some embodiments, solutions are provided that address the problem of underutilization of carrier aggregation by using real-time network statistical data to identify carrier aggregation underutilization and dynamically reconfiguring primary serving cell and secondary serving cell relationships to attempt to improve aggregation. In some embodiments, a carrier aggregation relationship configuration logic (CA-RCL) is executed, either within a base station or other network node, that dynamically computes carrier aggregation utilization statistics for current primary serving cell and secondary serving cell relationship configurations. The CA-RCL reconfigures primary serving cell and secondary serving cell relationships in order to provide carrier aggregation coverage to serving cell overlap regions where UE are located that would most efficiently utilize the extra bandwidth made available by carrier aggregation. The UE are able to deliver an enhanced user experience resulting from the greater data speeds and throughput achievable using carrier aggregation. Moreover, the ability of the communications network to dynamically reconfigure primary serving cell to secondary serving cell relationships to permit greater carrier aggregation utilization reduces congestion and improves resource utilization because the UE and the serving base station(s) are able to take advantage of available communication links and bandwidth more efficiently.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
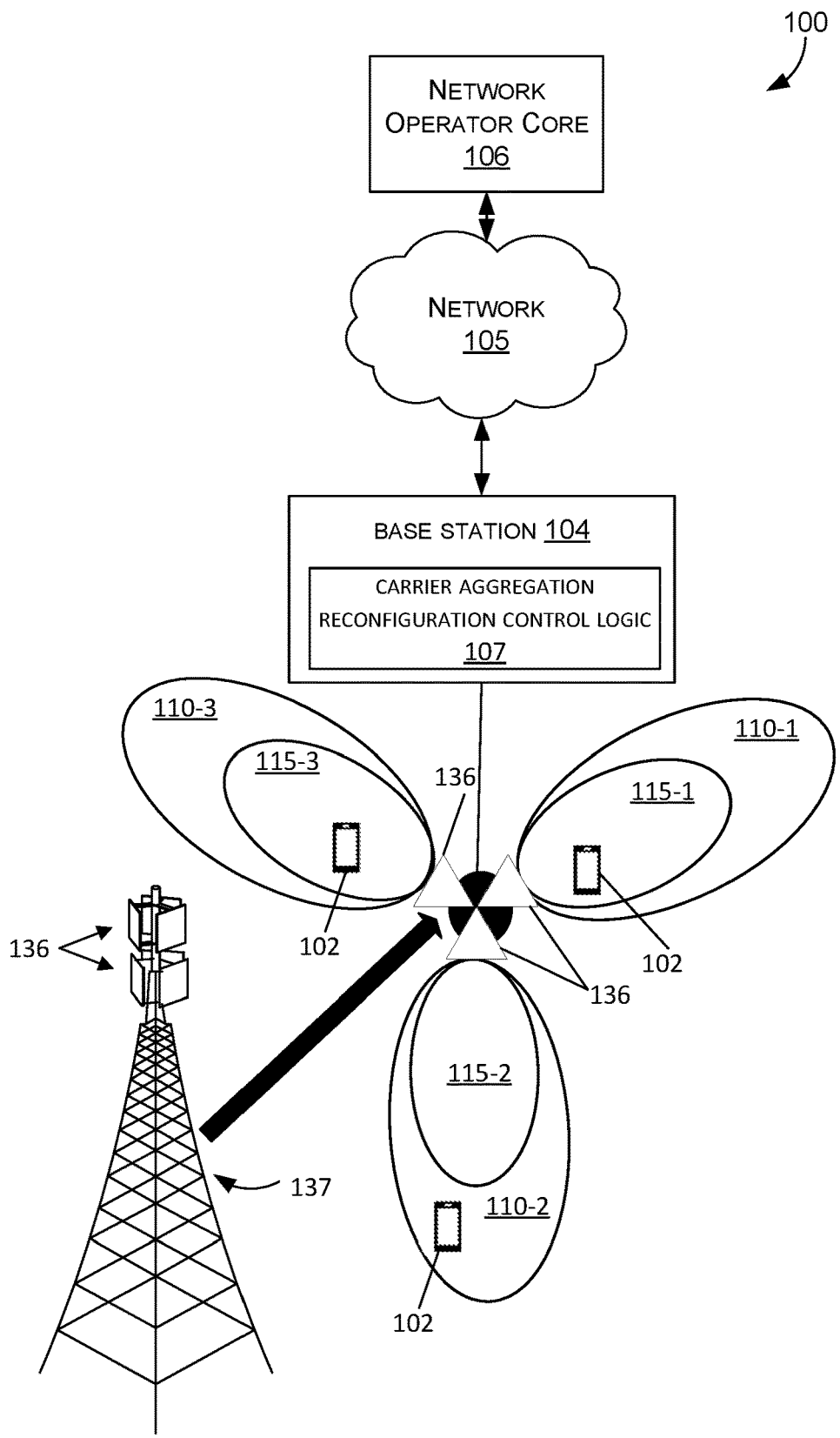
FIGS. 1 and 1A are diagrams illustrating an example network environment, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Carrier Aggregation (CA) is a provision of 5G and LTE standards that enables wireless operators to combine distinct carrier channels from a primary serving cell (P-cell) and at least one secondary serving cell (S-cell) into a single data channel to obtain higher data rates with mobile user equipment (UE). In general, for a UE to benefit from carrier aggregation, the UE is located within an overlapped area of cell boundaries that includes coverage from a primary serving cell operating via a primary component carrier (e.g. at carrier frequency, $f_1$), and a secondary serving cell operating via a second component carrier (e.g. at carrier frequency, $f_2$). The primary component carrier and second component carrier can either be within the same frequency band (e.g., both carriers in band N41) or within different frequency bands (e.g., one carrier in band N41 and the other in band N71). It should also be understood that primary component carrier and second component carrier can both implement the same duplexing scheme (e.g., both frequency division duplexing (FDD) or time division duplexing (TDD)), or different duplexing schemes (e.g., a combination of FDD and TDD).

The use of carrier aggregation improves data rates for UE by increasing the overall bandwidth of the logical channel available to the UE to send and/or receive data to the network operator core. Because of misalignment between cell boundaries, complete overlap of the primary serving cell and the secondary serving cell(s) is not always available. It is therefore not uncommon for one or more UEs within a geographic coverage region of a primary serving cell to be outside the geographic coverage region of a related secondary serving cell. In that situation, the UE are unable to use carrier aggregation. If the UE are located in a region overlapping with other secondary serving cells that are not related to their primary serving cell, they are still unable to use carrier aggregation because the primary and secondary serving cells overlapping at their location are not related for carrier aggregation purposed by the primary serving cell base station.

One or more of the embodiments of the present disclosure provide for, among other things, solutions that address the problem of underutilization of carrier aggregation by UE. These embodiments identify optimal carrier aggregation relations across primary and secondary serving cells dynamically based on real-time network data. More specifically, embodiments described herein implement carrier aggregation relationship configuration logic (CA-RCL), either within a base station or other network node, that dynamically computes carrier aggregation utilization statistics for current primary serving cell and secondary serving cell relationship configuration. The CA-RCL further optimally reconfigures primary serving cell and secondary serving cell relationships in order to provide carrier aggregation coverage to those regions of primary and secondary cell overlap regions where UE using the primary component carrier would most efficiently utilize the extra bandwidth made available by activating a secondary serving cell. As an example, a base station implementing CA-RCL may determine based on carrier aggregation utilization statistics that a current P-cell to S-cell relationship configuration (also referred to herein as a "serving cell relationship configuration") is potentially causing underutilization of available carrier aggregation resources. In some embodiments, CA-RCL may compute carrier aggregation utilization statistics based on metrics such as a number of secondary serving cell activations taking place, a ratio indicating a number of carrier aggregation configured UE within a primary serving cell to a number of carrier aggregation activations actually occurring, or other utilization metrics. Each time a UE capable of supporting carrier aggregation begins operating within the primary serving cell, that UE may request configuration for carrier aggregation utilization, and be configured to use carrier aggregation via a secondary serving cell, without actually activating use of the secondary serving cell. A carrier aggregation configured UE may remain in that configuration indefinitely (e.g., for the duration of its operation within the primary serving sell), and only actually activate the secondary serving cell for those limited durations of time when extra bandwidth (beyond what the primary serving cell can facilitate) is needed to transfer data.

When the CA-RCL computes a carrier aggregation utilization statistic that indicates potential underutilization, there may be more than one reason for the underutilization. For example, in some scenarios the underutilization determination may merely reflect that the bandwidth requirements for the UE currently within the primary serving cell are fully satisfied by the bandwidth provided by the primary serving cell. Those UE are therefore not requesting activation of carrier aggregation. As another example, the underutilization determination may instead indicate that a number of carrier aggregation configured UE are unable to use carrier aggregation because they are not located in an overlapping region of their primary serving cell and a related secondary serving cell. The CA-RCL may therefore attempt to improve the carrier aggregation utilization statistics by relating the primary serving cell to a different overlapping secondary serving cell. The resulting reconfigured P-cell to S-cell relationship may result in a greater number of UE falling within an overlap region that includes the newly related secondary serving cell. Those UE would then be able to activate the secondary serving cell for carrier aggregation when extra bandwidth is needed. The improved utilization of carrier aggregation resources by UE may be detected from improvements to the carrier aggregation utilization statistic. If the carrier aggregation utilization statistic does not improve, the CA-RCL may restore the prior P-cell to S-cell relationship configuration, or may attempt yet another P-cell to S-cell relationship configuration.

In some embodiments, the CA-RCL is implemented on a base station that hosts both the primary serving cell and the related secondary serving cell, and controls P-cell to S-cell relationships via the base station Media Access Control (MAC) layer. The Media Access Control (MAC) comprises the layer of the base station protocol stack that manages activation and deactivation of secondary serving cells and other aspects of carrier aggregation. In other embodiments where the primary and secondary serving cells originate from different base stations, the CA-RCL may be implemented on the base station hosting the primary serving cell and communicate carrier aggregation relations reconfiguration requests to base station(s) hosting the secondary serving cells. In still other embodiments, the CA-RCL may be implemented within a separate network node or server distinct from the base station (such as a $3^{rd}$ party server, for example). In such embodiments, the CA-RCL implemented on the network node may communicate carrier aggregation relation reconfiguration requests to both the primary serving cell and secondary serving cell hosting base stations.

With the embodiments presented herein, the end user benefits from an enhanced user experience resulting from the greater data speeds and throughput achievable using carrier aggregation. With respect to the implementing technology, the ability of the communications network to dynamically reconfigure P-cell to S-cell relationships to permit greater carrier aggregation utilization reduces congestion and improves resource utilization efficiencies because the UE and the serving base station(s) are able to take advantage of available communication links and bandwidth more efficiently, having the desirable consequence of reducing buffer loading and latency at both base stations and UEs. Moreover, technical benefits are realized with respect to network planning because network operators can plan for more optimal utilization of carrier aggregation by UE within each primary serving cell.

FIG. 1 is a diagram illustrating an example network environment 100 embodiment in which aspects of dynamic carrier aggregation configuration management, including carrier aggregation reconfiguration control logic (CA-RCL), may be implemented. Network environment 100 is but one example of a suitable network environment and is not intended to suggest any limitation as to the scope of use or functionality of the embodiments disclosed herein. Neither should the network environment 100 be interpreted as having any dependency or requirement relating to any one or combination of components illustrated.

As shown in FIG. 1, network environment 100 comprises a network operator core 106 that provides one or more wireless network services to one or more UE 102 via a base station 104, often referred to as a radio access network (RAN). In the context of fourth generation (4G) Longer Term Evolution (LTE), the base station 104 may be referred to as an eNodeB, or eNB. In the context of fifth generation (5G) New Radio (NR), the base station 104 may be referred to as a gNodeB, or gNB. Other terminology may also be used depending on the specific implementation technology. In particular, each UE 102 communicates with the network operator core 106 via the base station 104 over one or both of uplink (UL) radio frequency (RF) signals and downlink (DL) RF signals. The base station 104 may be coupled to the network operator core 106 by a backhaul network 105 that comprises wired and/or wireless network connections that may include wireless relays and/or repeaters. In some embodiments, the base station 104 is coupled to the network operator core 106 at least in part by the Internet or other public network infrastructure. The network environment 100 is configured for wirelessly connecting UEs 102 to other UEs 102 via the same base station 104, via other base stations, or via other telecommunication networks such as network 105 or a publicly-switched telecommunication network (PSTN), for example. Generally, each UE 102 is a device capable of unidirectional or bidirectional communication with radio units (also often referred to as radio points or wireless access points) of the base station 104 using RF waves.

As illustrated in FIG. 1, the base station 104 radiates and receives RF signals via one or more directional antennas 136 that each serve UE 102 that are located within a geographic area referred to as a cell or sector. The specific size, shape and orientation of a cell is a function, at least in part, on the design and azimuth (tilt) of each of the several antenna 136, and the carrier frequency of the carrier serving that cell. In the particular embodiment illustrated in FIG. 1, base station 104 forms six cells (or sectors) each via a respective antenna 136 mounted to a site tower 137. In other embodiments, a few or greater number of cells may be formed.

Cells 110-1, 110-2 and 110-3 operate at a first carrier frequency, $f_1$, and cells 115-1, 115-2 and 115-3 operate at a second carrier frequency, $f_2$. In some embodiments, carrier frequency, $f_1$, is a low-band frequency and carrier frequency, $f_2$, is a high- or mid-band frequency so that cells 115-1, 115-2 and 115-3 each cover relatively smaller geographic areas than cells 110-1, 110-2 and 110-3. In this example, when a UE 102 initializes communications with the base station 104, it is allocated one or more resource blocks available on carrier frequency, $f_1$, so that carrier frequency, $f_1$, is the primary component carrier for that UE 102. Depending on its physical location, one of the cells 110-1, 110-2 and 110-3 therefore serves as the primary serving cell for that UE 102. The cells 115-1, 115-2 and 115-3 operating with the carrier frequency, $f_2$, are each potential secondary serving cells for the secondary component carrier that may be used in combination with cells 110-1, 110-2 and 110-3 to implement carrier aggregation for UE 102.

As previously explained, secondary cell activation for a UE 102 is available when the UE 102 is located within an overlapping region of a primary serving cell and a secondary serving cell, and those primary and secondary serving cells are specifically related to each other by the base station 104 for purposes of carrier aggregation.

Figure 1A:
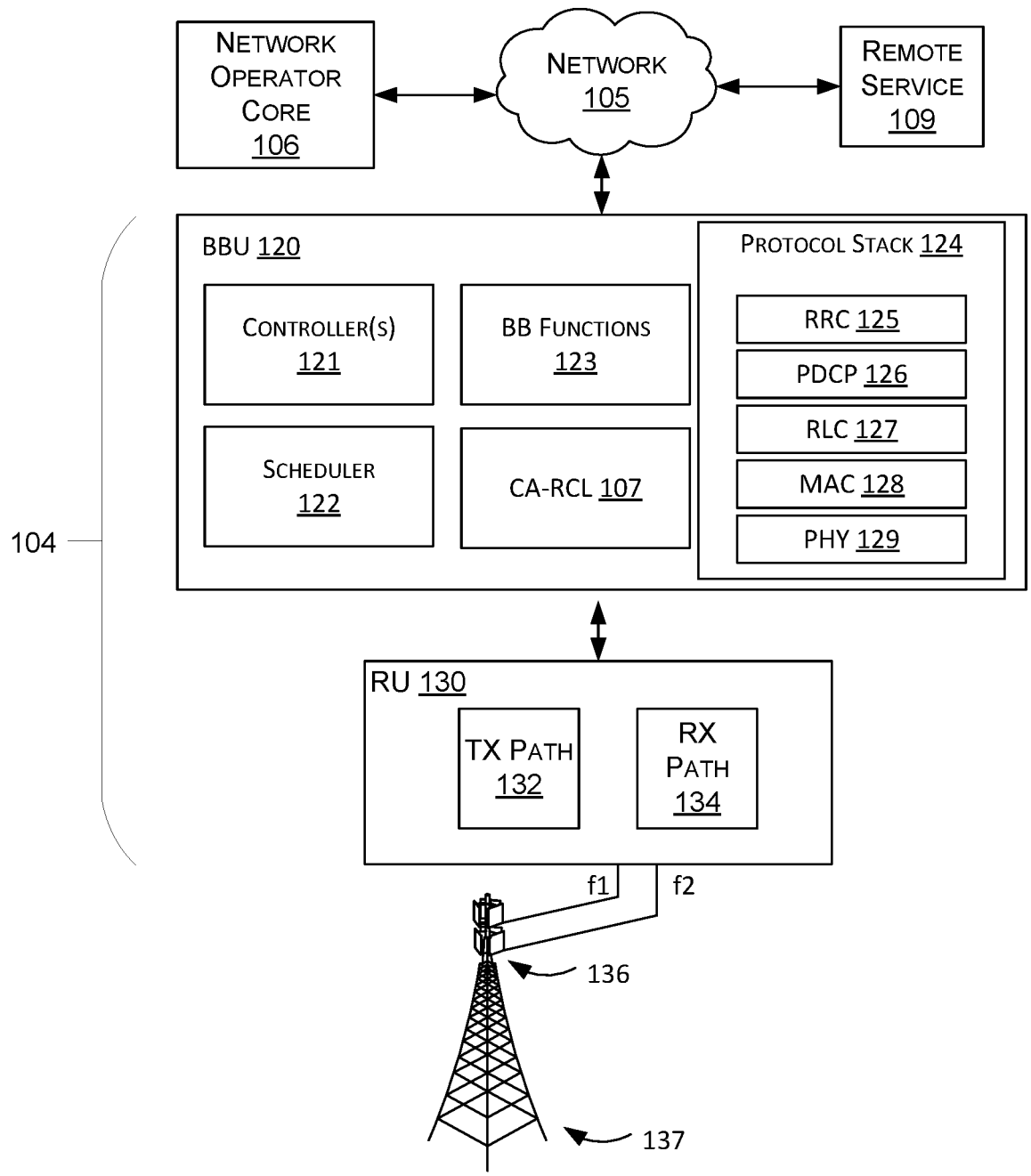

Referring now to FIG. 1A, FIG. 1A illustrates a base station 104 comprising a baseband unit (BBU) 120 coupled to a least one Radio Unit (RU) 130 through which the base station 104 serves a coverage area that comprises the cells 110-1, 110-2 and 110-3 and cells 115-1, 115-2 and 115-3 (shown in FIG. 1). The BBU 120 comprises the circuitry and functionality to implement an air interface and Open System Interconnection (OSI) Layer 1, Layer 2 and Layer 3 functions for the air interface. The RU 130 includes a radio head comprising transmit (TX) path 132 that includes radio transmitter circuitry (such digital-to-analog converters, one or more RF filters, frequency up-converters, and/or a Power Amplifier (PA)) and receive path (RX) 134 that includes radio receiver circuitry (such analog-to-digital converters, one or more RF filters, frequency down converters, and/or a Low Noise Amplifier (LNA).) The TX path 132 and RX path 134 may be coupled to the plurality of antenna 136 by an appropriate coupler (such as a duplexer, for example). The antennas 136 may be physically mounted to a site tower 137 or other structure (such as a building, for example). Downlink RF signals are radiated into the coverage area via TX path 132 and antenna 136 for reception by the UEs 102. Uplink RF signals transmitted by the UEs 102 are received via the antenna 136 and RX path 134. The base station 104 may communicate with the UE 102 using an air interface that supports Single Input Single Output (SISO), or Multiple Input Multiple Output (MIMO), Single Input Multiple Output (SIMO), Multiple Input Single Output (MISO) or other beam forming technologies. In some embodiments, the base station 104 may optionally support multiple air interfaces and/or multiple wireless operators.

The network environment 100 and base station 104 are generally configured for wirelessly connecting UE 102 to data or services that may be accessible on one or more application servers or other functions, nodes, or servers (such as a remote service 109, for example). In some implementations, the remote service 109 serves as the originating server or servers for operating data (such as environmental data, traffic condition data, navigation and/or other operating commands) delivered to the UE 102 and/or utilized for operation of the UE 102.

It should be understood that in some aspects, the network environment 100 shown in FIGS. 1 and 1A may implement one or more features of the network operator core 106 within other portions of the network, or may not implement them at all, depending on various carrier preferences.

As depicted in FIG. 1A, the BBU 120 may comprise one or more controllers 121 comprising a processor coupled to a memory and programed to perform one or more of the functions of the BBU 120 described herein. In some embodiments, the base station functions described herein may be executed by one or more controllers in a distributed manner utilizing one or more network functions orchestrated or otherwise configured to execute utilizing processors and memory of the one or more controllers. For example, where base station 104 comprises a gNodeB, the functions of the BBU 120 may be distributed between functional units comprising a Centralized Unit (CU) and at least one Distributed Unit (DU). As such, one or more functions of the base station described herein may be implemented by discrete physical devices or via virtual network functions.

The BBU 120 is responsible for, among other things, digital baseband signal processing, for example to process uplink and downlink baseband signals, shown in FIG. 1A as Baseband (BB) function(s) 123. The BBU 120 further includes a scheduler 122 through which the BBU 120 allocates resource blocks (RBs) to the UE 102 with respect to both uplink (UL) and downlink (DL) frames. A RB is the smallest unit of resource in a communication frame that can be allocated to a UE. In some embodiments, one RB is 1 slot long in time, and in frequency comprises a plurality of subcarriers each having a frequency width determined by the applicable air interface standard. For example, for LTE, one resource block is 180 kHz wide in frequency, typically comprising twelve 15 kHz subcarriers. The data carrier within each RB is referred to as the resource element (RE), which comprises 1 subcarrier×1 symbol, and transports a single complex value representing data for a channel. Functions performed by the scheduler 122 include, but are not limited to: Packet Scheduling (arbitration of access to air interface resources between active UE), resource allocation (allocation of air interface resources, such as resource blocks, to UE), and power allocations (adjusting transmit power to achieve desired data rates and signal-to-interference noise ratio (SINR) levels).

Uplink and downlink communications traffic between the BBU 120 and UE 102 are processed through a protocol stack 124 implemented by the BBU 120 that comprises various protocol stack layers. In the example embodiment illustrated in FIG. 1A, the protocol stack 124 includes a radio resource control (RRC) layer 125, packet data convergence protocol (PDCP) layer 126, radio link control (RLC) layer 127, medium access control (MAC) layer 128, and physical layer (PHY) 129. In some embodiments, the implementation of carrier aggregation is performed at least in part by the RRC layer 125 and MAC layer 128.

The MAC layer 128 is responsible, for example, for mapping between logical channels of the RLC layer 127 and transport channels of the PHY layer 129. MAC layer 128 may also perform functions such as, but not limited to, multiplexing of MAC service data units (SDUs) from logical channels onto transport blocks (TB) to be delivered to the PHY layer 129 on transport channels, de-multiplexing of MAC SDUs from one or different logical channels from transport blocks (TB) delivered from the PHY layer 129 on transport channels, scheduling information reporting, error correction through hybrid automatic repeat requests (HARD), priority handling between UEs by means of dynamic scheduling, priority handling between logical channels of one UE, and logical channel prioritization.

In some embodiments, MAC layer 128 manages multiplexing and demultiplexing of data across a primary component carrier and secondary component carriers when carrier activation is activated. For example, MAC layer 128 distributes data from each logical channel across the primary and secondary component carriers of serving cells identified to the MAC layer 128 (by CA-RCL 107, for example) as related for carrier aggregation purposes. Logical channels, are multiplexed to form transport blocks for each component carrier with each component carrier. When carrier aggregation is activated, a primary component carrier is provided from an antenna 136 to a primary serving cell, and one or more secondary component carriers are provided through one or more other antennas 136 for one or more secondary serving cells, at the same time. A primary serving cell is selected for a UE 102 during cell search by the UE 102. In some embodiments, secondary cell coverage is added and activated or deactivate by MAC layer 128 in response to signaling from RRC layer 125. For example, activation and deactivation of secondary component carriers may be managed through MAC control elements sent from the RRC layer 125 to the MAC layer 128. In some embodiments, deactivation of secondary component carriers by the MAC layer 128 may be time based.

As shown in FIG. 1A, in some embodiments the BBU 120 further implements the CA-RCL 107. The CA-RCL 107 works in conjunction with one or both of the RRC layer 125 and the MAC layer 128 to activate, deactivate, and/or reconfigure the current serving cell relationship configuration. The CA-RCL 107 also dynamically computes carrier aggregation utilization statistics for current primary serving cell and secondary serving cell relationships. In some embodiments, when the carrier aggregation utilization statistics indicate that carrier aggregation is underutilized with the current set of P-cell to S-cell relationships, the CA-RCL 107 may adjust or reconfigure one or more parameters of the MAC layer 128 to implement a different set of P-cell to S-cell relationships. In some embodiments, the CA-RCL 107 may store in memory a plurality of different predefined sets of P-cell to S-cell relationships for each primary serving cell that includes a set for each potential secondary serving cell that may be used in conjunction with the primary serving cell. For example, if the geographic area of a primary serving cell overlaps with the geographic areas of three potential secondary serving cells, the CA-RCL 107 may maintain a listing of the three predefined sets of P-cell to S-cell relationships for each possible P-cell to S-cell combination and select a set from that listing to initiate a reconfiguration of the MAC layer 128 for a new P-cell to S-cell relationship.

When the CA-RCL 107 reconfigures the MAC layer 128 for a new P-cell to S-cell relationship and the utilization statistic does not improve, the CA-RCL 107 may either reconfigure the MAC layer 128 to return to the initial set of P-cell to S-cell relationships, or reconfigure the MAC layer 128 to try yet another set of P-cell to S-cell relationships. In some embodiments, the CA-RCL 107 may instruct the RRC layer 125 to deactivate secondary component carriers prior to reconfiguring relationships parameters in the MAC layer 128, and/or instruct the RRC layer 125 to resume activation of secondary component carriers once reconfiguration of the MAC layer 128 is complete.

Figure 2:
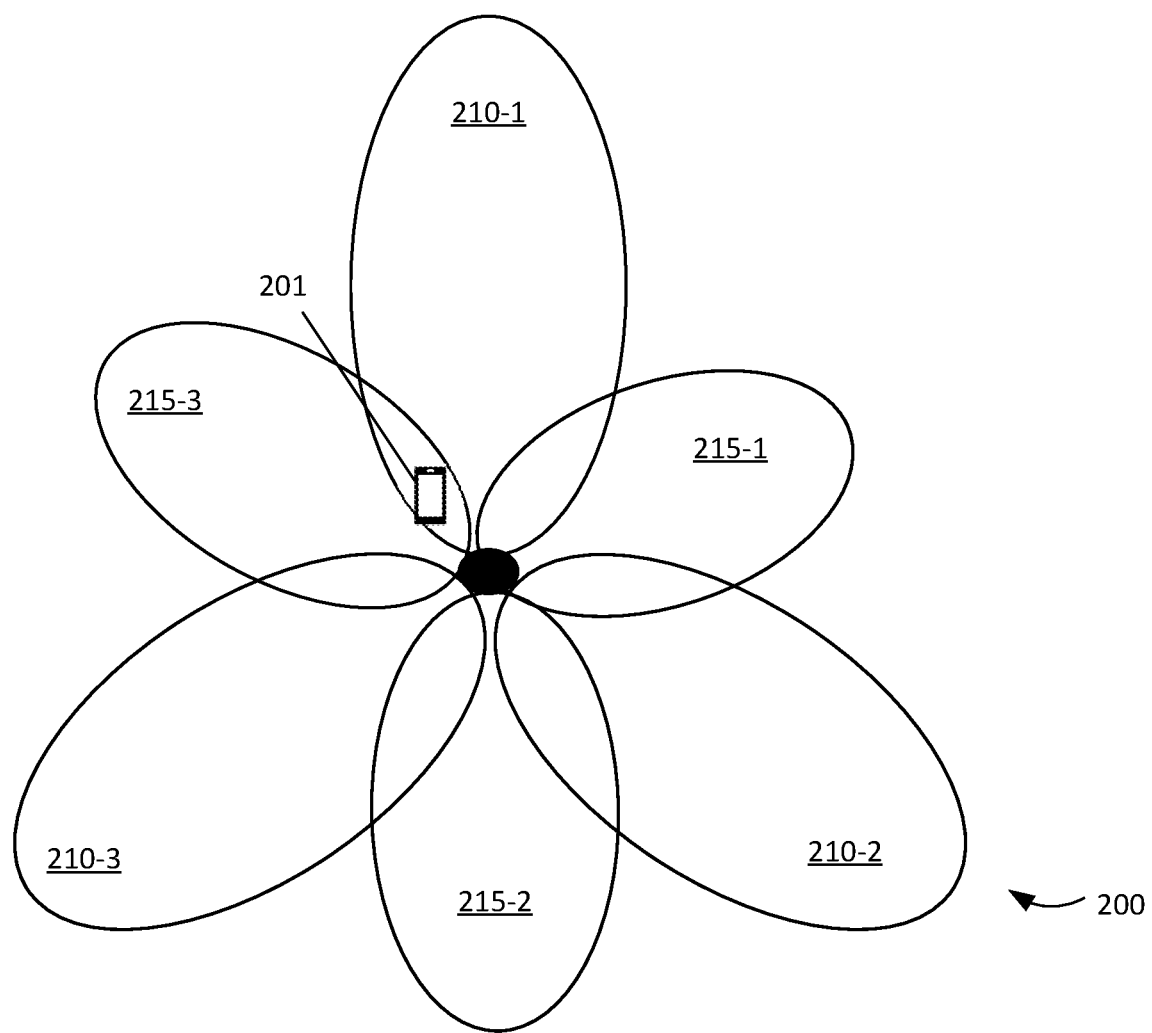
FIG. 2 is diagram illustrating an example of primary serving cell to secondary serving cell relationship reconfiguration according to an embodiment.

With reference to FIG. 2, an example of P-cell to S-cell relationship reconfiguration according to an embodiment is illustrated at 200. In this example, cells 210-1, 210-2 and 210-3 each operate at a first carrier frequency, $f_1$. The first carrier frequency, $f_1$, defines the primary component carrier so that that cells 210-1, 210-2 and 210-3 each function as primary serving cells. Cells 215-1, 215-2 and 215-3 each operate at a secondary carrier frequency, $f_2$. The secondary carrier frequency, $f_2$, defines the secondary component carrier so that cells 215-1, 215-2 and 215-3 each function as secondary serving cells. For the initial P-cell to S-cell relationship in this example, the MAC 128 is configured to relate primary serving cell 210-1 with secondary serving cell 215-1, primary serving cell 210-2 with secondary serving cell 215-2, and primary serving cell 210-3 with secondary serving cell 215-3.

UE 201 is located within the geographic area of primary serving cell 210-1 and is configured to use carrier aggregation. As shown in FIG. 2, UE 201 is also located within the geographic area of secondary serving cell 215-3, which overlaps with primary serving cell 210-1. However, with the current P-cell to S-cell relationship, secondary serving cell 215-3 cannot be activated for UE 201 for carrier aggregation because MAC layer 128 is not configured to relate primary serving cell 210-1 with secondary serving cell 215-3.

In this example, the CA-RCL 107 computes a carrier aggregation utilization statistic for primary serving cell 210-1 and determines that carrier aggregation for primary serving cell 210-1 is underutilized based on the carrier aggregation utilization statistic. To attempt to improve carrier aggregation utilization for primary serving cell 210-1, the CA-RCL 107 identifies that another possible P-cell to S-cell relationship for primary serving cell 210-1 is with secondary serving cell 215-3 (because secondary serving cell 215-3, like secondary serving cell 215-3, overlaps geographically with primary serving cell 210-1). The CA-RCL 107 therefore reconfigures MAC layer 128 to implement a P-cell to S-cell relationship between primary serving cell 210-1 and secondary serving cell 215-3. The UE 201 is now able to activate carrier aggregation within the overlapping region of primary serving cell 210-1 and secondary serving cell 215-3 and take advantage of the expanded bandwidth provided by communication links via a primary component carrier and a secondary component carrier.

In some embodiments, when MAC layer 128 is reconfigured by the CA-RCL 107 to relate primary serving cell 210-1 and secondary serving cell 215-3, that reconfiguration extinguishes the prior relationship between primary serving cell 210-1 and secondary serving cell 215-1. In other embodiments, however, reconfiguration of the MAC layer 128 by the CA-RCL 107 may add the relationship of secondary serving cell 215-3 to primary serving cell 210-1 without extinguishing the relationship of secondary serving cell 215-1 to primary serving cell 210-1. That is, in some embodiments, the MAC layer 128 may be reconfigured by the CA-RCL 107 to relate secondary serving cells 215-1 and 215-3 to the primary serving cell 210-1 for carrier aggregation purposes. It should also be appreciated that in some embodiments, carrier aggregation may be implemented between the primary component carrier of the primary serving cell, and any number of secondary component carriers to the extent that the geographic areas of the corresponding secondary serving cells overlap with the primary serving cell. For embodiments comprising aggregation of the primary component carrier with a plurality of secondary component carriers, the CA-RCL 107 may manage the P-cell relationships with the multiple S-cells based on one or more carrier aggregation utilization statistics in the same manner as discussed herein for carrier aggregation between a primary component carrier and single secondary component carrier.

Figure 3:
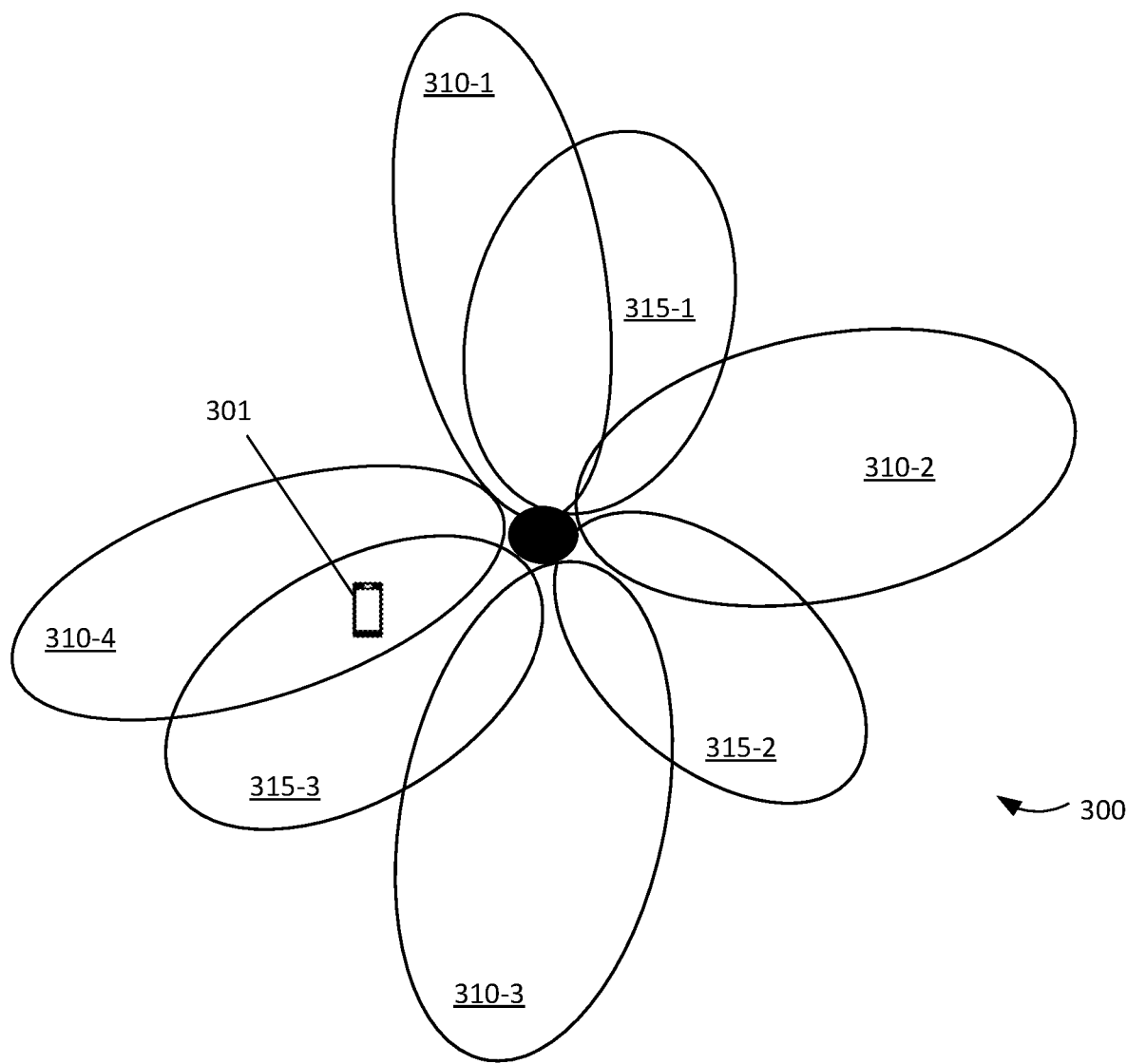
FIG. 3 is diagram illustrating an example of primary serving cell to secondary serving cell relationship reconfiguration according to an embodiment.

With reference to FIG. 3, another example of P-cell to S-cell relationship reconfiguration according to an embodiment is illustrated at 300. In the scenario of this example, the number of primary serving cells is not equal to the number of secondary serving cells. Cells 310-1, 310-2, 310-3 and 310-4 each operate at a first carrier frequency, $f_1$, (defining the primary component carrier) and function as primary serving cells. Cells 315-1, 315-2 and 315-3 each operate at a secondary carrier frequency, $f_2$, (defining a secondary component carrier) and function as secondary serving cells. For the initial P-cell to S-cell relationship in this example, the MAC 128 is configured to relate primary serving cell 310-1 with secondary serving cell 315-1, primary serving cell 310-2 with secondary serving cell 315-2, and primary serving cell 310-3 with secondary serving cell 315-3. This set of P-cell to S-cell relationships leaves primary serving cell 310-4 without a related secondary serving cell for implementing carrier aggregation. As such, a UE 301 within primary serving cell 310-4 may request configuration for carrier aggregation, but a secondary serving cell under the current P-cell to S-cell relationship configuration cannot be activated. In one embodiment, the CA-RCL 107 may determine based on carrier aggregation utilization statistics that carrier aggregation is underutilized in a secondary serving cell and attempt to improve utilization by relating that secondary serving cell to a different primary serving cell. For example, the CA-RCL 107 may determine that carrier aggregation in secondary serving cell 315-3, and reconfigure MAC layer 128 to instead relate secondary serving cell 315-3 to primary serving cell 310-4. UE 301, now being located within an overlap of a primary serving cell 310-4 and a related secondary serving cell 315-3, can begin activating carrier aggregation as needed. These activations may contribute to improved carrier aggregation utilization statistics.

Figure 4:
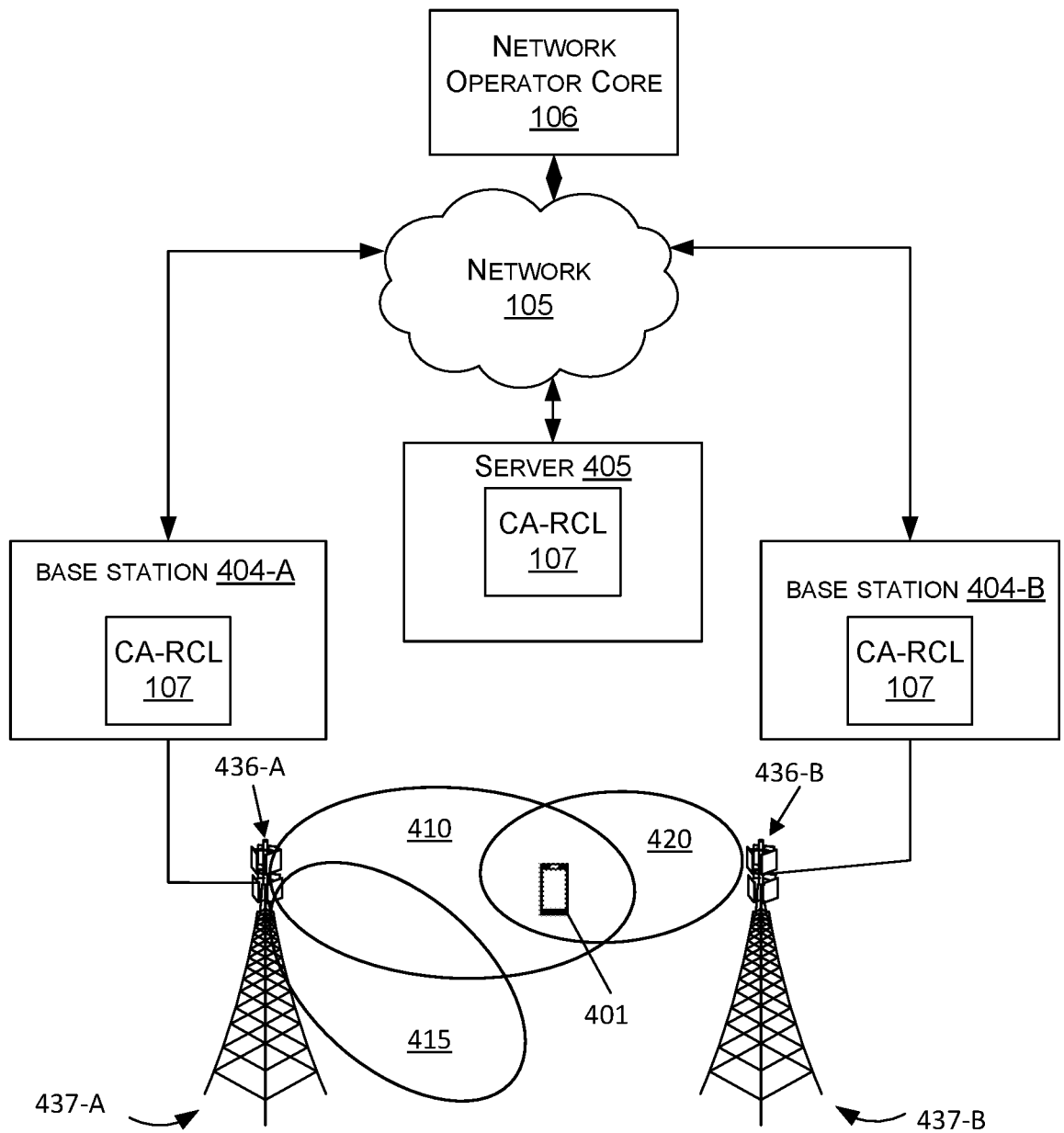
FIG. 4 is diagram illustrating another example network environment, in accordance with some embodiments described herein.

FIG. 4 illustrates an example embodiment of a network environment 400 (such as network environment 100 shown in FIG. 1) comprising a first base station 404-A and a second base station 404-B coupled to the network operator core 106 via network 105. In this example, base station 404-A is coupled to one or more antennas 436-A (which may be mounted to a site tower 437-A, for example). Base station 404-A forms at least one cell 410 that operates at a first carrier frequency, $f_1$, defining a primary component carrier. Cell 410 functions as a primary serving cell to at least one UE 401 within the geographic area of cell 410. Base station 404-A forms at least one other cell 415 that operates at a second carrier frequency, $f_2$. Cell 415 is configured by base station 404-A to relate to cell 410 for carrier aggregation purposes and therefore may function as a secondary serving cell for any UE that are located within the overlapping geographic regions of cell 410 and cell 415. Base station 404-B is coupled to one or more antennas 436-B (which may be mounted to a site tower 437-B, for example) and forms at least one cell 410 that operates at a third carrier frequency, $f_3$ (where the third carrier frequency, $f_3$, may be the same as, or different from, the second carrier frequency, $f_2$). For this embodiment, the CA-RCL 107 may be implemented in the base station 404-A for the primary serving sell 410, in a separate network node or server 405 coupled to the base station 404-A via a network (such as network 105, for example), or implemented in a distributed fashion between base station 404-A and server 405.

In this example, the UE 401 is within the coverage area of base station 404-A and communicates with the network operating core 106 over the primary component carrier of primary serving cell 410. However UE 401 is not within the overlapping region between primary serving cell 410 and related secondary serving call 415 and therefore cannot activate carrier aggregation given the current serving cell relationship configuration at base station 404-A.

In some embodiments, the CA-RCL 107 may detect (for example, from carrier aggregation utilization statistics) an underutilization of carrier aggregation within primary serving cell 410 and further detect that UE 401 is located within a overlapping region with cell 420 from base station 404-B. The CA-RCL 107 may attempt to improve carrier aggregation utilization by reconfiguring the serving cell relationship configuration to relate primary serving cell 410 with secondary serving cell 420 from base station 404-B and activate secondary serving cell 420 for use by UE 401. In some embodiments where the CA-RCL 107 is implemented in the base station 404-A, the CA-RCL 107 may send a reconfiguration request message (via network 105) to base station 404-B to relate secondary serving cell 420 to primary serving cell 410. In this new configuration, UE 401 is provided an expanded bandwidth comprising one or more allocated RBs from a primary component carrier of base station 404-A and one or more allocated RBs from a secondary component carrier from base station 404-B. In some embodiments, a CA-RCL 107 implemented in base station 404-B processes the reconfiguration request message to produce the updated serving cell relationship configuration. For embodiments where the CA-RCL 107 is implemented in a separate server 405, the CA-RCL 107 may send reconfiguration request messages (via network 105) to both the base station 404-A and the base station 404-B. In some embodiments, a CA-RCL 107 implemented in each of the base stations 404-A and 404-B processes the reconfiguration request messages to produce a updated serving cell relationship configuration per the requests.

Figure 5:
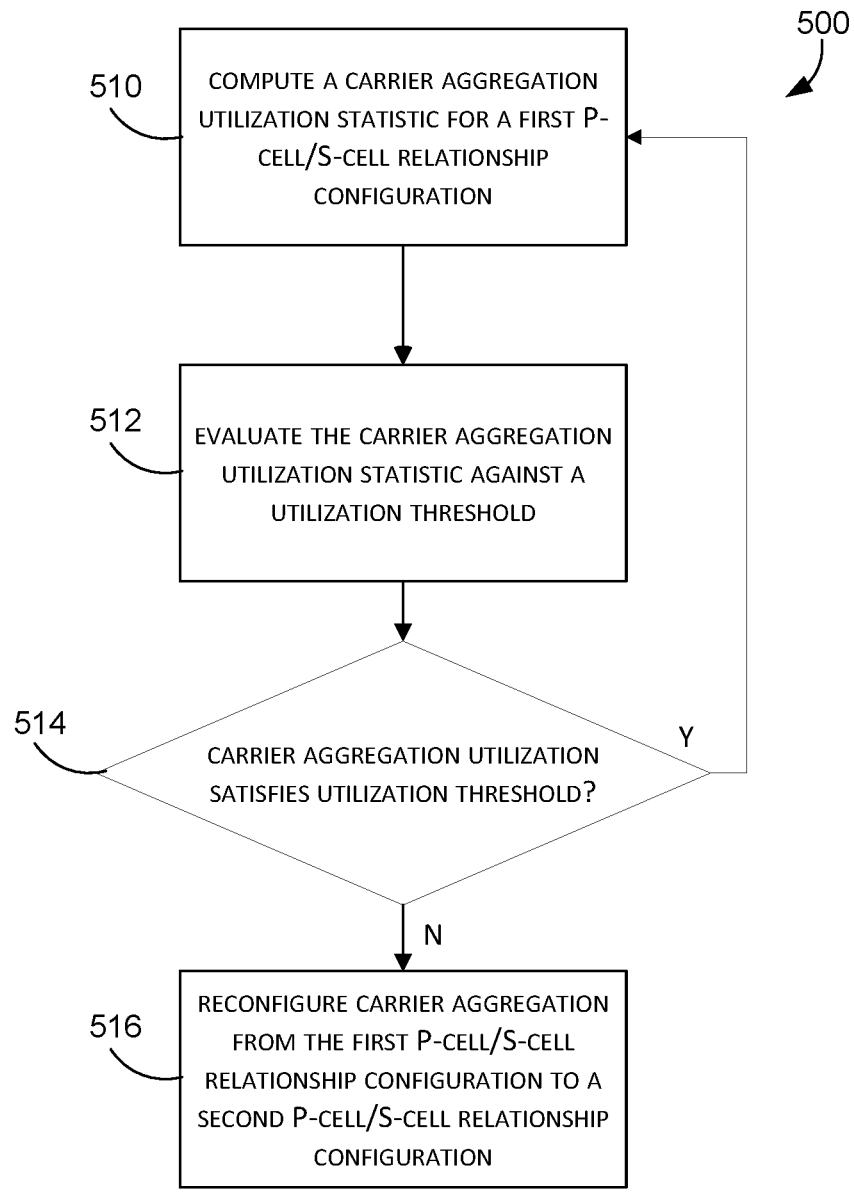
FIG. 5 is flow chart illustrating a method for dynamically managing carrier aggregation configuration according to an embodiment.

FIG. 5 is a flow chart illustrating a method 500 for dynamically managing carrier aggregation configuration according to an embodiment. It should be understood that the features and elements described herein with respect to the method of FIG. 5 may be used in conjunction with, in combination with, or substituted for elements of, any of the other embodiments discussed herein and vice versa. Further, it should be understood that the functions, structures, and other descriptions of elements for embodiments described in FIG. 5 may apply to like or similarly named or described elements across any of the figures and/or embodiments described herein and vice versa. In some embodiments, elements of method 500 are implemented utilizing a CA-RCL 107 executing on a base station BBU or separate network node or server as discussed herein.

Method 500 begins at 510 with computing a carrier aggregation utilization statistic for a first serving cell relationship configuration. As an example, CA-RCL may determine based on carrier aggregation utilization statistics that a current serving cell relationship configuration is potentially causing underutilization of available carrier aggregation resources. In some embodiments, CA-RCL may compute carrier aggregation utilization statistics based on metrics such as a number of secondary serving cell activations taking place, a ratio indicating a number of carrier aggregation configured UE within a primary serving cell to a number of carrier aggregation activations actually occurring, or other utilization metrics. For example if one or more UE are configured for carrier aggregation in a primary serving cell but few (or no) secondary serving cell activations are occurring, the utilization statistic may indicate that the current serving cell relationship configuration is a suboptimal configuration. The method 500 therefore includes at 512 evaluating the carrier aggregation utilization statistic against a utilization criteria (such as a utilization threshold, for example). For example, the method may compare the carrier aggregation utilization statistic against the utilization criteria and when the evaluation indicates that the carrier aggregation utilization statistic satisfies the utilization criteria (determined at 514), then the method returns to 510.

When the evaluation indicates that the carrier aggregation utilization statistic does not satisfy the utilization criteria, then the method 500 proceeds to 516 which includes reconfiguring carrier aggregation from the first serving cell relationship configuration to a second serving cell relationship configuration.

In some embodiments, reconfiguring carrier aggregation comprises selecting a new serving cell relationship configuration based on network statistics. For example, in some embodiments, a base station may actuate inter-frequency handover (IHO) protocols, or other protocols, that generate measurement reports that are used by the CA-RCL to select the new serving cell relationship configuration. In some embodiments, UE operating within a primary serving cell compute inter frequency measurements and report those measurements back to the base station, where the measurements can be utilized by the CA-RCL. If the CA-RCL is selecting between multiple candidate secondary component carriers, measurement reports received from UE may indicate which candidate secondary component carriers are available for use by the greatest number of carrier aggregation configured UE, so that an optimal corresponding secondary serving cell(s) may be re-related to the primary serving cell. Example measurement reports include, but are not limited to, Reference Signal Receive Power (RSRP) measurements that indicate an average power of Resource Elements (RE) that carry Reference Signals (RS) across the bandwidth, and Reference Signal Received Quality (RSRQ) measurements that indicate a signal quality of RS received by UE. Other network statistics may also be considered. For example, in some embodiments, the CA-RCL may utilize UE handover statistics. For example, if a greater number of UE within geographic area of the primary serving cell are handing over to a first candidate secondary component carrier than a second candidate secondary component carrier, then selecting the first candidate secondary component carrier to relate to the primary component carrier may yield greater activation and utilization of carrier aggregation, and thus superior carrier aggregation utilization statistics.

In some implementations, a network operator may elect not to activate IHO protocols or measurement reports are otherwise not available. Accordingly, in some embodiments, reconfiguring carrier aggregation comprises selecting a new serving cell relationship configuration by applying relation shifting (either in a clockwise or counter-clockwise direction), and monitoring for positive or negative changes to the computed carrier aggregation utilization statistic. For example, referring back to FIG. 2, if the first serving cell relationship configuration relates primary serving cell 210-1 to secondary serving cell 215-1, then the CA-RCL may execute relation shifting in the counter-clockwise direction to relate primary serving cell 210-1 to secondary serving cell 215-3 for the second serving cell relationship configuration. The CA-RCL may then monitor the carrier aggregation utilization statistic for a predetermine duration of time, and if the statistics continue not meet the utilization criteria, then shift counter-clockwise again. When a serving cell relationship configuration is found that produces a carrier aggregation utilization statistic meeting the utilization criteria, then that configuration is selected as the selected carrier aggregation utilization statistic and the method returns to 510.

Figure 6:
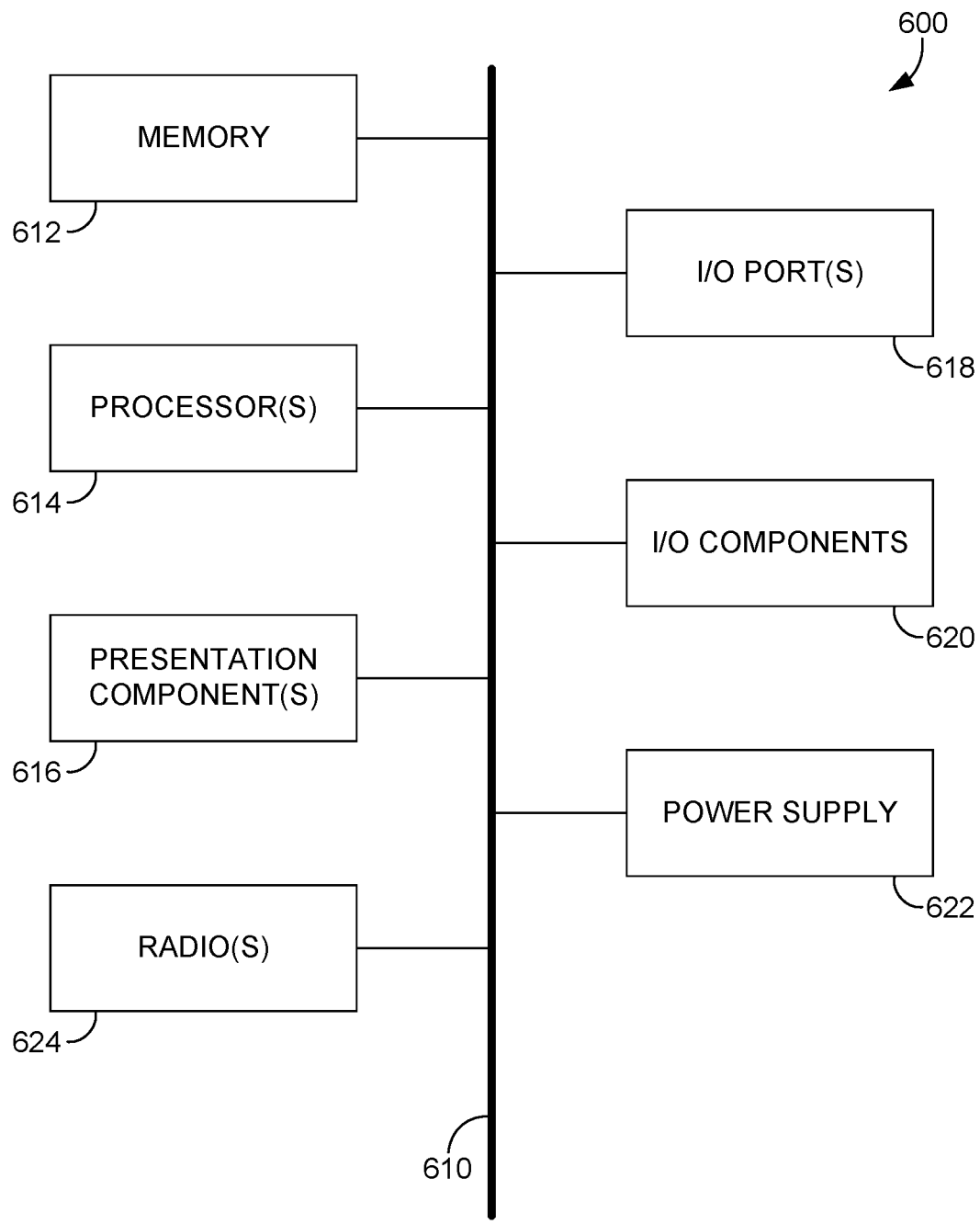
FIG. 6 is diagram illustrating an example computing environment according to an embodiment.

Referring to FIG. 6, a diagram is depicted of an exemplary computing environment suitable for use in implementations of the present disclosure. In particular, the exemplary computer environment is shown and designated generally as computing device 600. Computing device 600 is but one example of a suitable computing environment and is not intended to suggest any limitation as to the scope of use or functionality of the embodiments described herein. Neither should computing device 600 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 610 that directly or indirectly couples the following devices: memory 612, one or more processors 614, one or more presentation components 616, input/output (I/O) ports 618, I/O components 620, power supply 622, and radio 624. Bus 610 represents what may be one or more busses (such as an address bus, data bus, or combination thereof). The devices of FIG. 6 are shown with lines for the sake of clarity. However, it should be understood that the functions performed by one or more components of the computing device 600 may be combined or distributed amongst the various components. For example, a presentation component such as a display device may be one of I/O components 620. Also, processors, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device." In some embodiments, the carrier aggregation relationship configuration logic (CA-RCL) as described in any of the examples of this disclosure may be implemented at least in part by code executed by the one or more processors(s) 614 and in some embodiments. In some embodiments, the one or more processors(s) 614 correspond to the one or more controllers 121 that execute the various functions of the BBU 120.

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. Memory 612 may be removable, nonremovable, or a combination thereof. Exemplary memory includes solid-state memory, hard drives, optical-disc drives, etc. Computing device 600 includes one or more processors 614 that read data from various entities such as bus 610, memory 612 or I/O components 620. One or more presentation components 616 may present data indications to a person or other device. Exemplary one or more presentation components 616 include a display device, speaker, printing component, vibrating component, etc. I/O ports 618 allow computing device 600 to be logically coupled to other devices including I/O components 620, some of which may be built in computing device 600. Illustrative I/O components 620 include a microphone, joystick, game pad, satellite dish, scanner, printer, wireless device, etc.

Radio(s) 624 represents a radio that facilitates communication with a wireless telecommunications network. Illustrative wireless telecommunications technologies include CDMA, GPRS, TDMA, GSM, and the like. Radio 824 might additionally or alternatively facilitate other types of wireless communications including Wi-Fi, WiMAX, LTE, or other VoIP communications. As can be appreciated, in various embodiments, radio(s) 624 can be configured to support multiple technologies and/or multiple radios can be utilized to support multiple technologies. A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Figure 7:
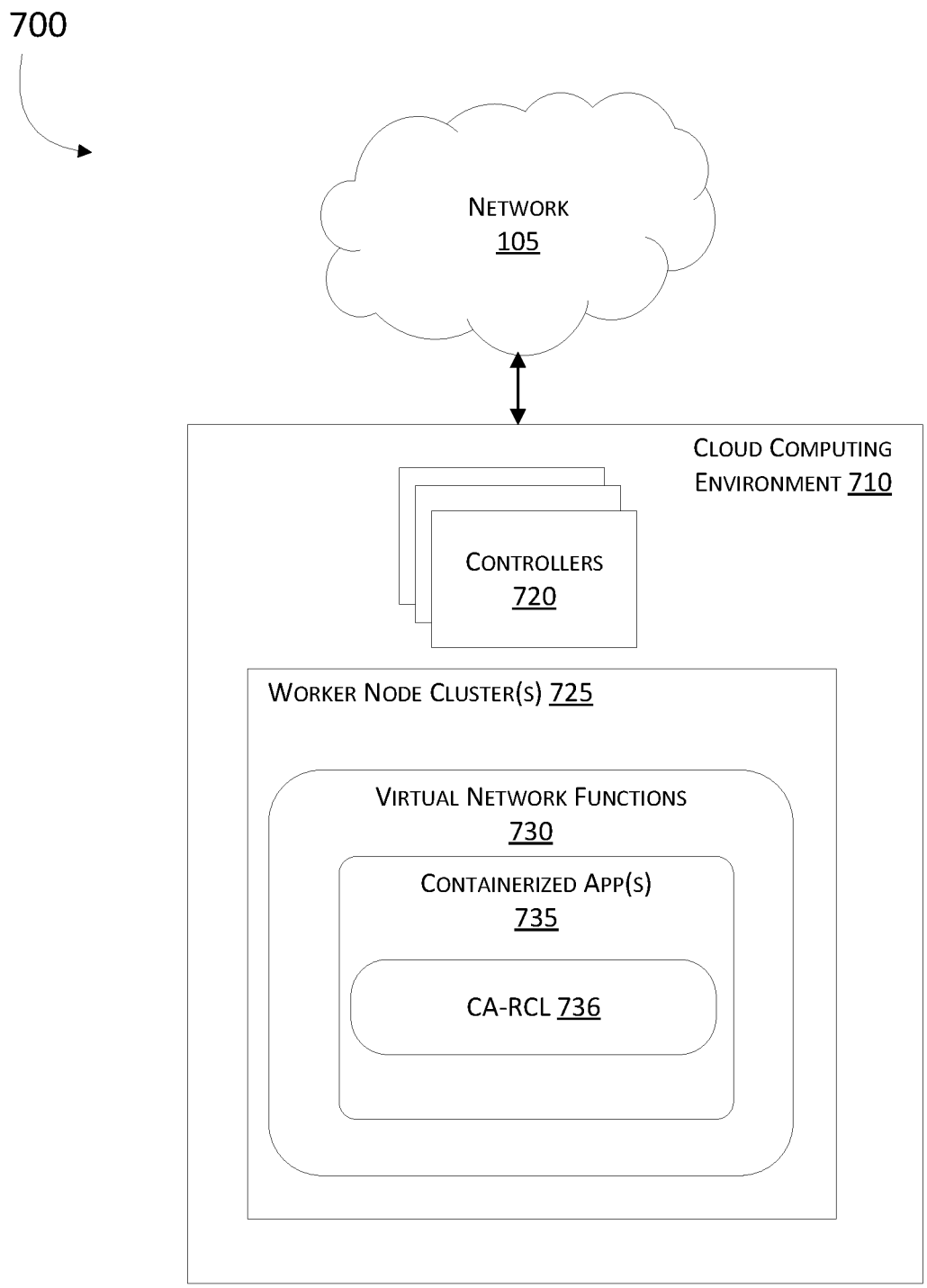
FIG. 7 is diagram illustrating an example cloud computing environment according to an embodiment.

Referring to FIG. 7, a diagram is depicted general at 700 of an exemplary cloud computing environment 710 for implementing one or more aspects of carrier aggregation relationship configuration logic (CA-RCL) as described in any of the examples of this disclosure. Cloud computing environment 710 is but one example of a suitable cloud computing environment and is not intended to suggest any limitation as to the scope of use or functionality of the embodiments presented herein. Neither should cloud computing environment 710 be interpreted as having any dependency or requirement relating to any one or combination of components illustrated. In some embodiments, the cloud computing environment 710 is executed within the network 105, or otherwise coupled to the base station 104 and/or network operator core 106.

Cloud computing environment 710 includes one or more controllers 720 comprising one or more processors and memory. The controllers 720 may comprise servers of a data center. In some embodiments, the controllers 720 are programmed to execute code to implement at least one or more aspects of the CA-RCL. For example, in one embodiment CA-RCL comprises one or more virtualized network functions (VNFs) 730 running on a worker node cluster 725 established by the controllers 720. The cluster of worker nodes 725 may include one or more orchestrated Kubernetes (K8s) pods that realize one or more containerized applications 735 for the CA-RCL (shown at 736).

In various alternative embodiments, system and/or device elements, method steps, or example implementations described throughout this disclosure (such as the base station, baseband unit (BBU), radio unit (RU), scheduler, CA-RCL, or any of the sub-parts thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Very High Speed Integrated Circuit (VHSIC) Hardware Description Language (VHDL).

As used herein, terms such as base station, radio access network, network operator core, user equipment (UE), baseband unit (BBU), radio unit (RU), scheduler, CA-RCL function, network node, server, and other terms derived from these words refer to the names of elements that would be understood by one skilled in the art of wireless telecommunications and related industries as conveying structural elements, and are not used herein as nonce words or nonce terms for the purpose of invoking 35 U.S.C. 112(f). The terms "function", "unit", "node" and "module" may also be used to describe computer processing components and/or one or more computer executable services being executed on one or more computer processing components.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for dynamic carrier aggregation cell relationship management, the system comprising:
   one or more processors; and
   one or more computer-readable media storing computer-usable instructions that, when executed by the one or more processors, cause the one or more processors to:
   compute a carrier aggregation utilization statistic for a first serving cell relationship configuration;
   determine when a carrier aggregation utilization statistic indicates that carrier aggregation is underutilized for the first serving cell relationship configuration based on a comparison of the carrier aggregation utilization statistic to a utilization criteria; and
   reconfigure carrier aggregation from the first serving cell relationship configuration to a second serving cell relationship configuration based on determining that carrier aggregation is underutilized, wherein the first serving cell relationship configuration comprises pairing of a first primary serving cell (P-cell) and at least a first secondary serving sell (S-cell) and the second serving cell relationship configuration comprises a pairing of the first P-cell and at least a second S-cell.

2. The system of claim 1, wherein the one or more processors select the second serving cell relationship configuration from a plurality of candidate serving cell relationship configurations.

3. The system of claim 1, wherein the carrier aggregation utilization statistic is computed as a function of a number of secondary serving cell activations.

4. The system of claim 1, wherein the carrier aggregation utilization statistic comprises a ratio indicating a number of carrier aggregation configured user equipment (UE) within a primary serving cell to a number of secondary serving cell activations.

5. The system of claim 1, wherein the one or more processors execute;
   a base station protocol stack comprising at least a base station Media Access Control (MAC) layer; and
   a carrier aggregation relationship configuration logic (CA-RCL);
   wherein the CA-RCL adjusts at least one parameter of the base station MAC layer to reconfigure carrier aggregation from the first serving cell relationship configuration to the second serving cell relationship configuration.

6. The system of claim 5, the base station protocol stack further comprising a radio link control (RLC) layer; and
   wherein the CA-RCL adjusts the at least one parameter of the base station MAC layer using at least one MAC control element sent from the RLC layer.

7. The system of claim 1, wherein the one or more processors select the second serving cell relationship configuration based on one or more network statistics.

8. The system of claim 1, wherein the one or more processors select the second serving cell relationship configuration based on measurement reports received from user equipment (UE).

9. The system of claim 1, wherein the one or more processors reconfigure carrier aggregation by relation shifting and monitoring for a change to the carrier aggregation utilization statistic.

10. A method for dynamic carrier aggregation serving cell relationship management, the method comprising:
    computing a carrier aggregation utilization statistic for a first serving cell relationship configuration, the first serving cell relationship configuration comprising pairing of a primary serving cell (P-cell) and at least a first secondary serving sell (S-cell);
    determining when the carrier aggregation utilization statistic indicates that carrier aggregation is underutilized for the first serving cell relationship configuration based on a comparison of the carrier aggregation utilization statistic to a utilization criteria; and
    when the carrier aggregation utilization statistic does not meet the utilization criteria, reconfiguring carrier aggregation from the first serving cell relationship configuration to a second serving cell relationship configuration, the second serving cell relationship configuration comprising a pairing of the primary serving cell (P-cell) and at least a second secondary serving sell (S-cell).

11. The method of claim 10, wherein the carrier aggregation utilization statistic is computed as a function of a number of secondary serving cell activations.

12. The method of claim 10, wherein the carrier aggregation utilization statistic is computed as a ratio indicating a number of carrier aggregation configured user equipment (UE) within a primary serving cell to a number of secondary serving cell activations.

13. The method of claim 10, further comprising:
    selecting the second serving cell relationship configuration based on one or more network statistics.

14. The method of claim 10, further comprising:
selecting the second serving cell relationship configuration based on measurement reports received from user equipment (UE) within a primary serving cell.

15. The method of claim 10, further comprising:
selecting the second serving cell relationship configuration based on relation shifting and monitoring for a change to the carrier aggregation utilization statistic.

16. The method of claim 10, wherein the second serving cell relationship configuration comprises a primary serving cell formed by a first base station and a secondary serving cell formed by a second base station.

17. A wireless communication base station system, the system comprising:
at least one controller comprising one or more processing units configured to execute one or more functions of a wireless communication base station, wherein the wireless communication base station is configured to communicate with one or more user equipment (UE) over one or both of uplink (UL) radio frequency (RF) signals and downlink (DL) RF signals, the one or more functions including:
a carrier aggregation relationship configuration logic (CA-RCL) configured to:
compute a carrier aggregation utilization statistic for the wireless communication base station;
determine when the carrier aggregation utilization statistic indicates that carrier aggregation is underutilized for a first serving cell relationship configuration based on a comparison of the carrier aggregation utilization statistic to a utilization criteria; and
based on determining that carrier aggregation is underutilized, reconfigure carrier aggregation from the first serving cell relationship configuration to a second serving cell relationship configuration, wherein the first serving cell relationship configuration comprises pairing of a first primary serving cell (P-cell) and at least a first secondary serving sell (S-cell) and the second serving cell relationship configuration comprises a pairing of the first P-cell and at least a second S-cell.

18. The system of claim 17, the one or more functions further including:
a base station protocol stack comprising at least a base station Media Access Control (MAC) layer, wherein the CA-RCL reconfigures carrier aggregation by reconfiguring one or more parameters of the base station MAC layer.

* * * * *